United States Patent [19]
De Jong

[11] Patent Number: 6,158,569
[45] Date of Patent: Dec. 12, 2000

[54] DEVICE FOR REMOVING AND INSERTING UPRIGHT POSITIONED FLAT PRODUCTS

[75] Inventor: Henricus N. J. De Jong, Delft, Netherlands

[73] Assignee: B.V. Machinefabrienk Houdijk, Netherlands

[21] Appl. No.: 09/081,652

[22] Filed: May 20, 1998

[30] Foreign Application Priority Data

May 29, 1997 [NL] Netherlands ............................ 1006157

[51] Int. Cl.$^7$ .................................................. B65H 39/02
[52] U.S. Cl. ..................................... 198/418.2; 270/58.29
[58] Field of Search ........................ 198/418.2; 270/58.29

[56] References Cited

U.S. PATENT DOCUMENTS

| | | | |
|---|---|---|---|
| 591,801 | 10/1897 | Agnew | 270/58.29 |
| 3,054,612 | 9/1962 | Godlewski | 270/58.29 |
| 3,981,394 | 9/1976 | Slather et al. | 198/418.2 |
| 4,304,325 | 12/1981 | May et al. | 198/418.2 |
| 4,588,179 | 5/1986 | Gutierrez | 270/58.29 |
| 4,801,036 | 1/1989 | Rathert | 270/58.29 |
| 4,936,077 | 6/1990 | Langen et al. | 198/418.2 |
| 5,775,067 | 7/1998 | Hawley | 198/418.2 |

FOREIGN PATENT DOCUMENTS

| | | | |
|---|---|---|---|
| 775 189 | 5/1972 | Belgium . | |
| 521836 | 3/1931 | Germany | 198/418.2 |
| 3444599 | 6/1986 | Germany | 198/418.2 |
| 521 265 | 4/1972 | Switzerland . | |
| 828618 | 5/1972 | United Kingdom . | |
| 1513861 | 6/1978 | United Kingdom | 198/418.2 |
| 2063831 | 6/1981 | United Kingdom | 198/418.2 |
| 2 255 544 | 11/1992 | United Kingdom . | |

*Primary Examiner*—Douglas Hess
*Attorney, Agent, or Firm*—Larson & Taylor, PLC

[57] ABSTRACT

A device for removing and inserting flat products positioned upright, which are fed in a number of channels, includes feed stopping members and removing members. The removing members are led along the respective feeding channels, which are oblique to the path of the removing members by a drive and control system. The removing members can also be given a movement perpendicular to the drive direction in the closed path, as a result of which a certain amount of products can be removed from two or more channels.

7 Claims, 4 Drawing Sheets

DEVICE FOR REMOVING AND INSERTING UPRIGHT POSITIONED FLAT PRODUCTS

FIELD OF THE INVENTION

The invention relates to a device for removing and inserting flat products positioned upright, which are fed in a number of channels and which are provided with feed stopping members and removing members.

BACKGROUND OF THE INVENTION

A device by which such products can be taken from a number of channels is known from e.g. EP-A-0 128 669. With this known device, the fed products are stopped at the ends of the channels, until a removing member has been positioned in alignment with said channel. Then, the stopping member is moved upwards, due to which the products can slide to the removing member. Subsequently, the stopping member is brought to a backward position in the row and is inserted between the products and is then returned to the end of the channel. In this way, a row of products of a predetermined length can be fed to the removing member and then to e.g. a packaging device with the help of the removing member.

EP-A-0 164 305 discloses a device in which a row of products of a predetermined length is fed from a feed channel to a removing member. To that end, in addition to a stopping member, a separate member has been provided that can be inserted into the row of products at the desired distance. The distance has been made adjustable, in which a rather complex drive system has been provided for driving the various members.

Said known devices, in which a row of products of the desired length is dimensioned and brought into the removing member in one run, have proven to cause too many failures, in that the stopping member functions in an unreliable way. Further, the required structure is complex, as a result of which the various members are poorly accessible in case of failure. Apart from that, in the known devices the feeding member providing for the product supply is complex and voluminous.

SUMMARY OF THE INVENTION

The object of the invention is to provide a device having a sufficiently high removal capacity and by which rows of products can be quickly fed to a further processing device in a simple way.

Accordingly, the invention provides drive and control means by means of which the removing members can be moved along the respective feeding channels and can remove a determined amount of products from two or more channels, in which it is further provided for, that the control means are designed in such a way that the removing members can be moved in a direction transverse to the driving direction in a closed path to be followed by the removing members.

It has also been provided for that the control means force the removing members into a movement being approximately perpendicular to the feeding channels and that the control means return the removing members to a fixed predetermined starting point for each subsequent feeding channel.

With the arrangement of the feeding channels and the control of the removing members it is achieved that each removing member removes a predetermined amount of products, such as biscuits, from the subsequent feeding channels. By the oblique position of the feeding channels in relation to the path of said removing members, and the movement of said removing members which is perpendicular to said path, the removing members must be returned to the position of a next feeding channel by movement transverse to the driving direction. With this movement, the products already removed slide along the removing member across a distance providing enough space for the products to be removed from the next feeding channel. The removed products rest on a support plate situated underneath the removing members and being at the same height as the bottom of the feeding channels.

Removing products in this way offers the further advantage that the feeding channels can be executed much simpler than with the known devices.

Beyond the last feeding channel, a conveyor belt of a further processing device connects to the support plate being in alignment with the driving direction of the rows of products. Said conveyor belt is provided with receiving members for the rows of products, in which the receiving members have a mutual distance corresponding to the distance between the removing members, and they are driven at the same speed as the removing members.

According to the invention, it has been provided for that the removing members are substantially elongated in a direction transverse to the driving direction in the closed path to be travelled, and that the control means in a part of the closed path following the part of the path alongside the feeding channels move the removing members transverse to the driving direction across a. major part of the length of the removing members or almost the complete length thereof.

Since in the part of the path of the removing members along the feeding channels said removing members are in alignment with the receiving members of the conveyor belt into which said rows of products are positioned, through said further measures the removing members can come to lie completely adjacent the device having the conveyor belt with receiving members.

In this way, the removing members are in alignment with the receiving members where it is necessary, and the removing members can follow a path downward back to the beginning of the subsequent series of feeding channels. This offers the advantage that the whole occupies less space, that there are no obstacles hampering the visual inspection of the removed and inserted products, and that easy and safe manual intervention from above is possible, if necessary.

According to a further elaboration of the invention, it is provided for, that the driving means comprise an endless conveyor connected with a number of coupling members intended for coupling the removing members to the endless conveyor, in which each of said coupling members is provided with guides for receiving a removing member, said guides only allowing movement of the removing members in a direction transverse to the driving direction. Guides for the coupling members are also provided, said guides being designed such, that the coupling members can only move in a fixed path parallel to the path of the endless conveyor.

With said measures, the possible movement of the removing members is limited to only a movement perpendicular to the driving direction in the plane of the path.

According to the invention, it is further provided for, that guiding elements mounted on the removing members and guides for said guiding elements mounted in a path substantially parallel to the path of the removing members belong to the control means. Thus, a simple guide for the removing members is achieved, which functions excellently and reliably.

The invention also relates to feed stopping members near the ends of the feeding channels, said stopping members protruding at one side or at both sides over and/or beneath the path of the removing members and allow passage to the removing members. At the downstream side, the feed stopping members leave the fed products completely free, so that they can be taken away from the row by a removing member. The distance across which the feed stopping members protrude is adjustable, said distance determining the number of products being taken along by the removing members.

By adjusting the stopping members in a predetermined pattern of alternately more or less products between the moments that the products are removed, the number of products in a roll can be chosen precisely. For example, with a device having 10 feeding channels a roll of 32 products can be composed by 2 quantities of 4 products and 8 quantities of 3 products.

BRIEF DESCRIPTION OF THE DRAWINGS

The invention is further explained below by way of a drawing, in which.

DETAILED DESCRIPTION OF THE PREFERRED EMBODIMENTS

Figure 1:
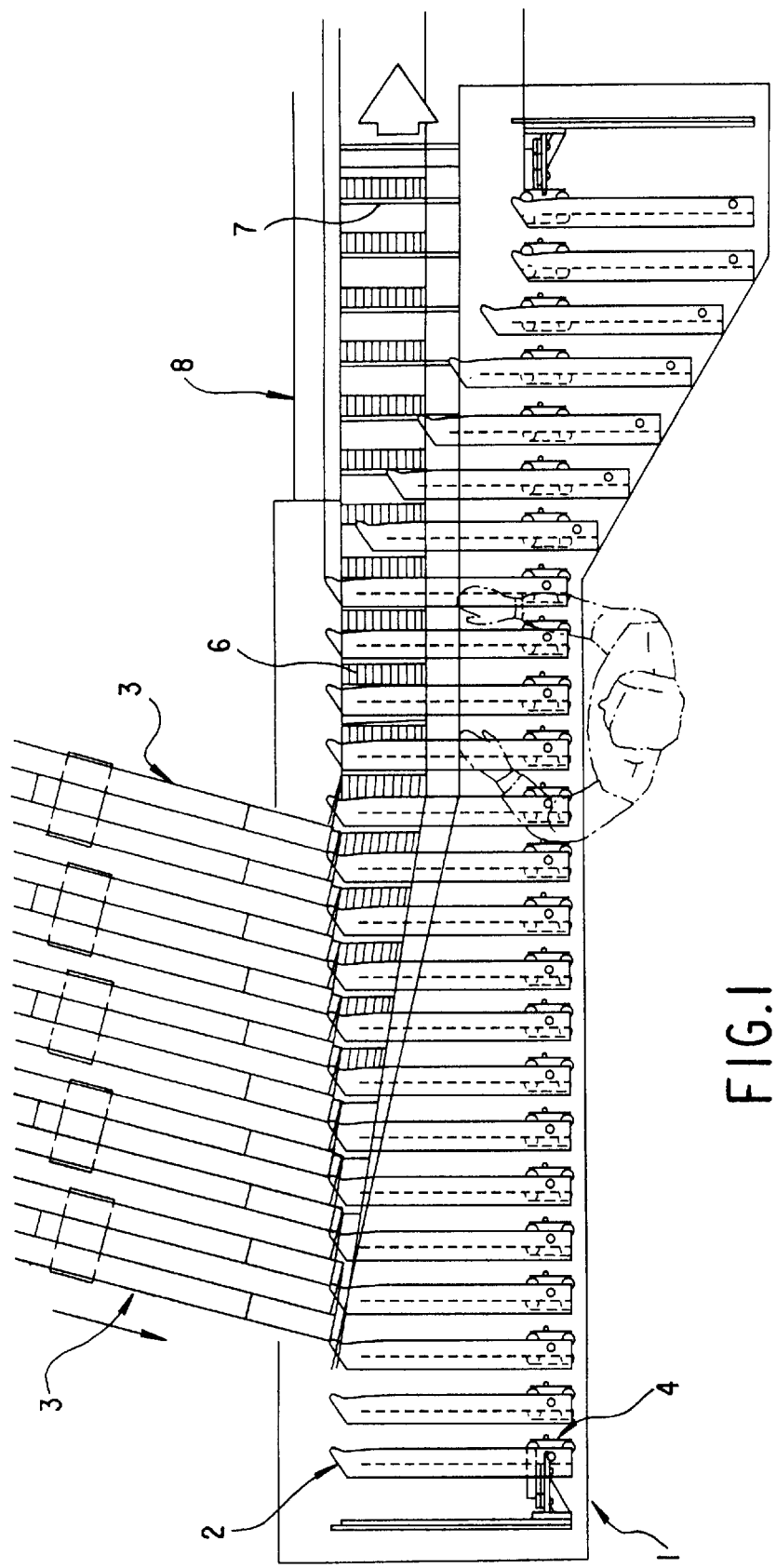
FIG. 1 shows a plan view of a device according to the invention.

FIG. 1 shows the device 1 having a number of removing members 2 being driven in a path along the feeding channels 3. The removing members 2 are mounted on coupling members 4, by which the removing members are connected to an endless conveyor 5 (see FIG. 3).

After passing the feeding channels 3, the removed rows of products 6 are delivered to receiving members 7 by the removing members 2, said receiving members belonging to a conveyor belt system 8 situated in extension of the path portion of the removing members 2 along the feeding channels 3. Said conveyor belt system 8 can be part of a further processing device, such as e.g. a packaging device, or the products can be fed to a further processing device by said system.

From the moment the rows of products 6 arrive in the receiving members 7, the removing members 2 are no longer in contact with the products, and they can be moved sidewards transverse to the driving direction, until—seen in vertical direction—they are entirely out of engagement with said conveyor belt system 8. From there, the path can bend downwards and return, in which the removing members can be returned in transverse direction. The latter can occur after the conveyor belt system has passed or, if possible, after the removing members have arrived at a height where they can return further underneath the conveyor belt system.

Figure 2:
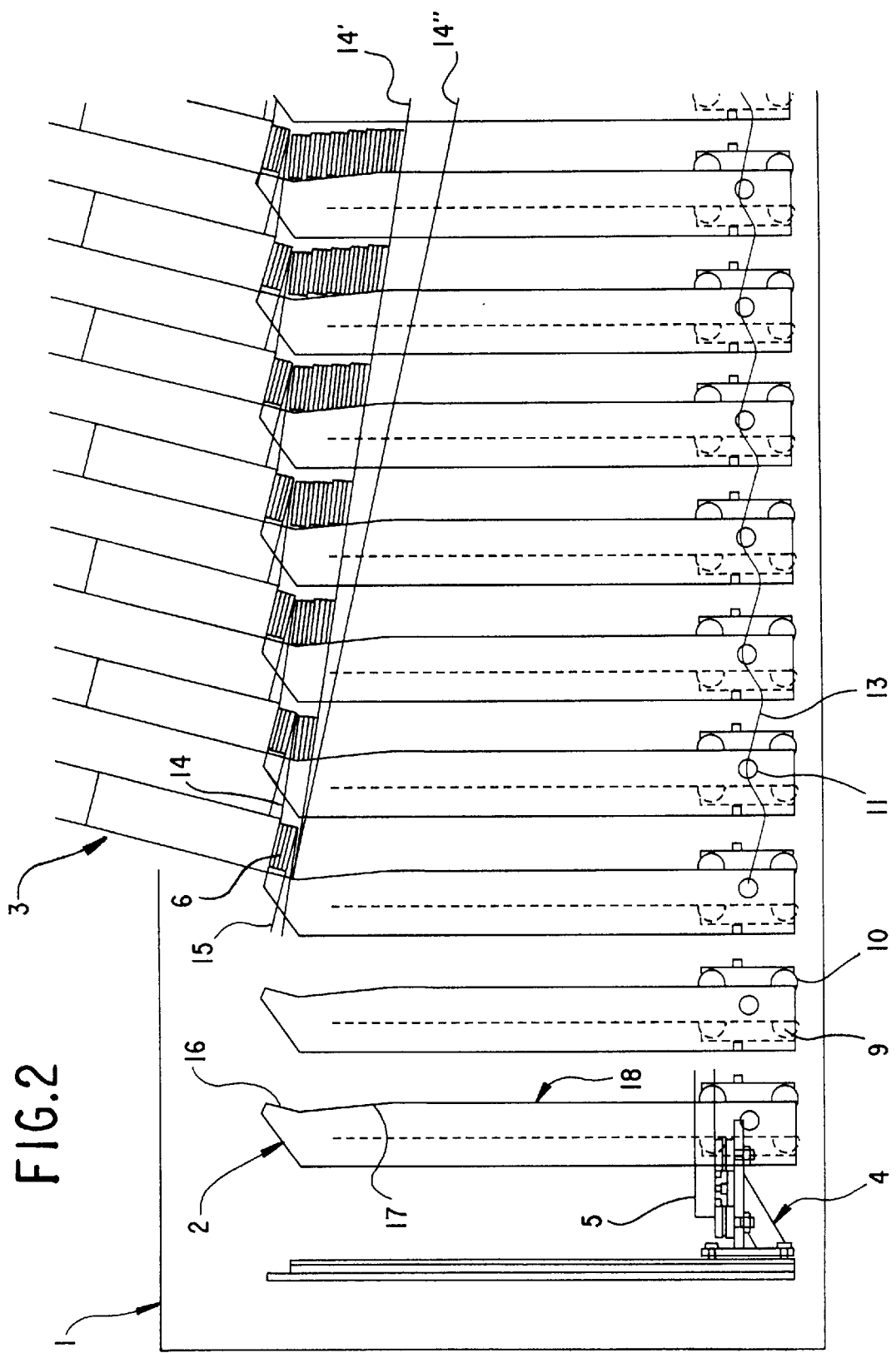
FIG. 2 shows a part of FIG. 1 on a larger scale.

FIG. 2 shows removing of the numbers of products 6 from the feeding channels 3 by the removing members 2 in more detail. The removing members 2 are mounted between two pairs rollers 9, 10 on the coupling members 4, as a result of which the removing members 2 can only move in their longitudinal direction.

Figure 4:
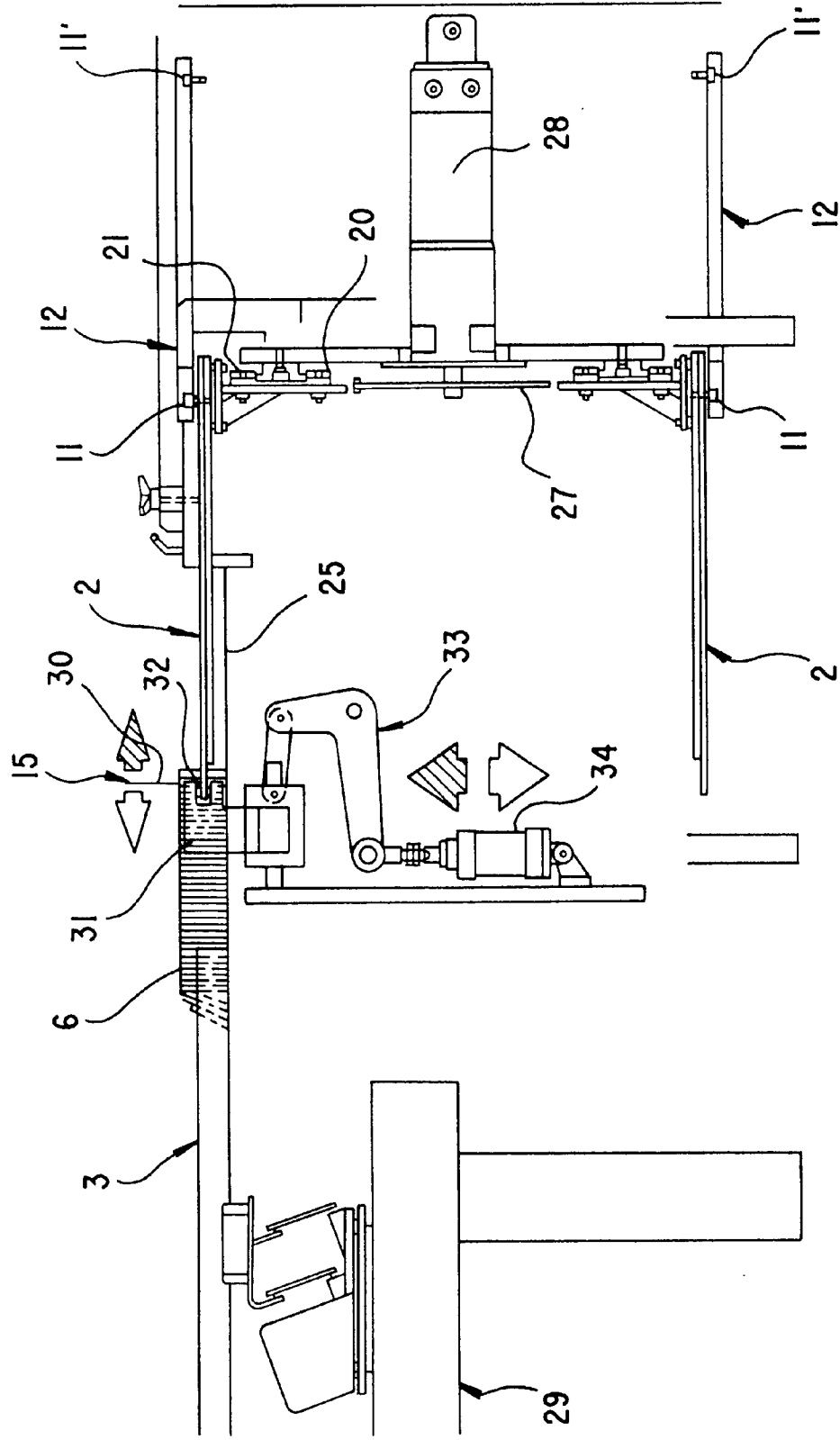
FIG. 4 shows a view of the feed stopping members.

For control of said movement, guiding elements 11 are provided at the upper side of the removing members, said guiding elements being intended for cooperation with a guide 12 (see FIG. 4). The movement made by the removing members 2 at the level of the feeding channels 3 is schematically indicated by the line 13. Due to this, the points of the removing members move in a direction perpendicular to the feeding channels 3, and are returned to the starting point of a next feed channel immediately after passing a feed channel.

In the given example, the products protrude over such a distance, that continually 4 products are taken away. The distance across which the fed row products protrudes is controlled with a feed stopping member 15 (see FIG. 4), and depends on the thickness of the individual products and the number of products to be accommodated in a row. Basically, with a certain product, always a fixed predetermined number of products will be removed from the feeding channels 3, which also results in a predetermined number per feeding channel 3. However, it is possible to change the adjustments of the stopping members between subsequent removals, as a result of which it is possible to vary the number of removed products and thus to prepare various roll lengths.

The removing members 2 have at their carrying sides 18 a first portion 16 extending parallel to the feeding channels and by which the products are removed from the row. On passing a feeding channel, the number of removed products remains fixedly positioned in relation to the first portion 16.

Lateral guides 14 for the removed products are mounted between the feeding channels 3, due to which a removing member 2—before a next feeding channel 3 is reached—can be moved along the products with the first portion 16 without taking said products along. Owing to this, the first portion 16 will at the starting point of a next removal again be available for removing a next number of products.

Further, a lateral guide 14' is provided that will be contacted by the beginning of the row of removed products and which has an oblique course until just beyond the last feeding channel. Said guide 14' is adjusted to a certain desired length of a row of products to be removed, in which 14" indicates a certain maximum length for a row of products to be removed.

The first portion 16 is not allowed to protrude beyond the carrying side 18 of the removing member 2, since such a protruding portion, on lateral movement of the removing member 2 after delivering a row of products to a receiving member 7, might yet contact said row of removed products. Therefore, the first portion 16 is a recess in the removing member 2 returning to the carrying side 18 through a second portion 17.

Figure 3:
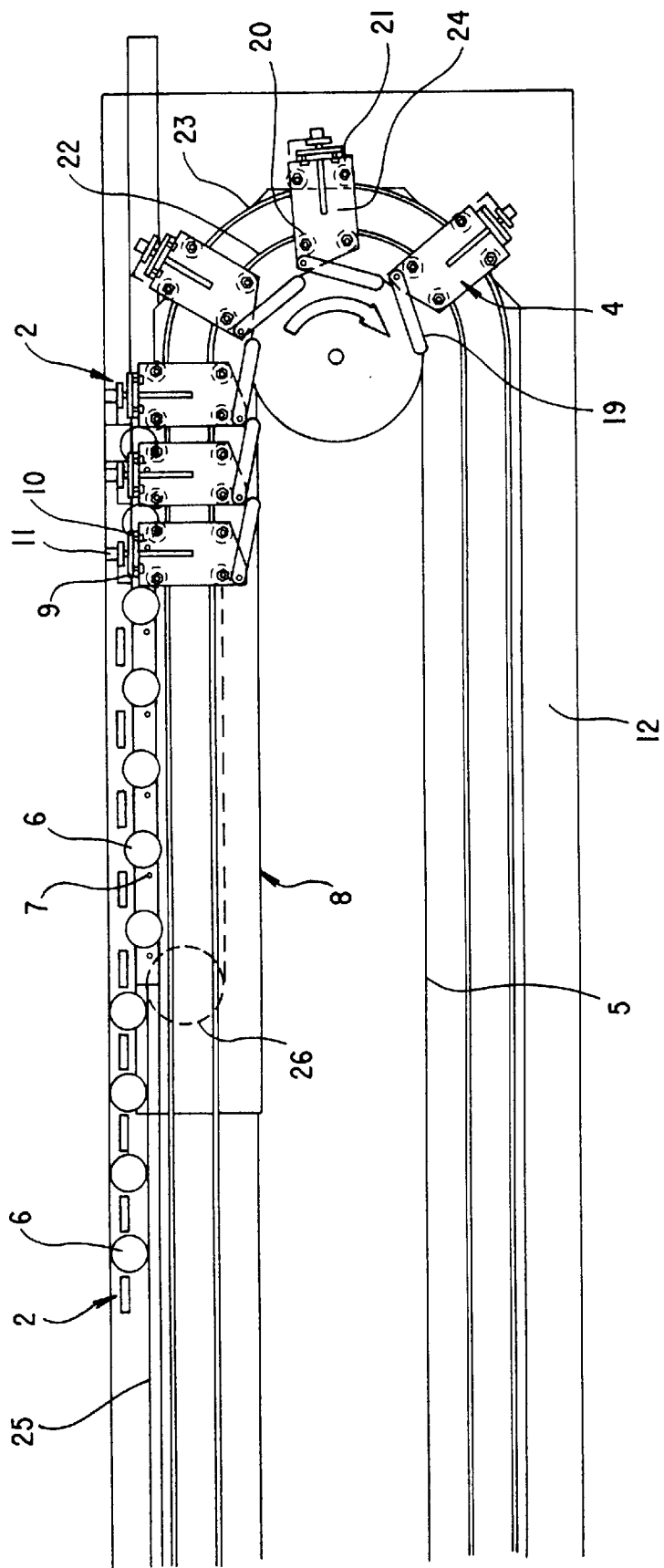
FIG. 3 shows a side view of the endless conveyor and the removing members.

FIG. 3 shows a side view of the endless conveyor 5, which is preferably a chain, which is connected to the coupling members through arms 19. Parallel pairs of rollers 20, 21 enclosing respective guides 22, 23 are mounted on mounting plate 24 of said coupling members 4. Due to this, the path of the coupling members is completely set, and with it also the path of the removing members 2 being able to move only in one direction in relation to the coupling members.

The guide 12 for the guiding elements 11 mounted on the removing members 2 is schematically illustrated with a dashed line in this figure.

The conveyor belt system 8 with the receiving members is at a slightly lower level than the support plate 25 across which the products are moved by the removing members. Owing to this, the rows of products will come out of engagement with the removing members while being received in the receiving members 7. Receiving the rows of products takes place near the roller 26 of the conveyor belt system 8, whereupon the removing members can immediately be directed away from the conveyor belt system 8. The vertical distance across which the conveyor belt system extends in the example is relatively limited, and ends approximately at the top upper side of the chain wheel 27 for the endless chain 5. If no supports were mounted at the level of the removing device for the conveyor belt system, from this point the removing members can be returned to the starting position in which they arrive at the feeding channels 3. However, generally it will be preferred to execute the path symmetrical with a horizontal plane of symmetry, so that the required ground plane for the removing device in itself will remain as small as possible.

FIG. 4 shows a cross-sectional view of the device in which the feed stopping member 15 is clearly illustrated. The products 6 are fed through the feeding channel 3, which is positioned on a vibrating table 29 here, and are stopped with the feed stopping member 15.

The feed stopping member 15 is provided with a first plate portion 30 being connected to an arm portion 31, in which a recess 32 is mounted in the arm portion, said recess providing a passage for the removing members 2. Here, the first plate portion may consist of a lower and an upper part situated respectively below and above said recess 32, or may consist of only one single part. The arm portion 31 is situated at one side of the fed products, so that at the other side, they are free to be taken along by the removing members.

The feed stopping member 15 is movable, in the plane of the drawing to the left and the right, with the help of an operating member 34 and transmission 33. In this way, the number of products to be removed can be controlled.

In the figure, the position of the guide 12 for the guiding elements 11 at lower and upper side is indicated, as well as the extreme positions for the guiding elements 11, 11' in the guide. Finally, the drive 28 for the endless chain 5 is indicated.

What is claimed is:

1. Device for removing flat products positioned upright, comprising:

feeding channels for receiving the products, the channels including feed stopping members;

removing members for taking products from the feeding channels; and drive and control means for moving the removing members in a first direction and in a second direction, the first direction being a driving direction in a closed conveyor track to be followed by the removing members and the second direction being transverse to the first direction, the feeding channels running obliquely to the first direction of movement in longitudinal direction, and enclosing an acute-angle downstream of an imaginary point of intersection between the first direction and one of the feeding channels, the removing members being elongated in a direction substantially perpendicular to the first direction, each of the removing members including a front side having a first part parallel to the longitudinal direction of the feeding channels and a second part substantially perpendicular to the first direction, the first part being located at an outer end at a side of the feeding channels, the control means forcing the removing members into a compound movement approximately perpendicular to the feeding channels and returning the removing members to a fixed determined starting point for each subsequent feeding channel.

2. Device according to claim 1, wherein in that the driving direction in the path of the removing members and the feeding direction of the products enclose a sharp angle.

3. Device according to claim 1, wherein the driving means comprises an endless conveyor connected with a number of coupling members for coupling the removing members to the endless conveyor, each of said coupling members including guides for receiving a removing member, said guides only allowing movement of the removing members in a direction transverse to the driving direction.

4. Device according to claim 3, wherein the guides for said removing members mounted on the coupling members comprise pairs of spaced apart rollers either enclosing at least part of the removing members or being enclosed by said removing members.

5. Device according to claim 4, further comprising guides for the coupling members, said guides for the coupling members only allowing movement of the coupling members in a fixed path parallel to the path of the endless conveyor.

6. Device according to claim 5, wherein said guides for the coupling members comprise two guides mounted in the plane of the endless conveyor, or in a plane parallel to the plane of the endless conveyor, in spaced apart relationship and parallel to the path of the endless conveyor, said two guides enclosing respective pairs of rollers mounted on the coupling members or being enclosed by said rollers.

7. Device according to claim 1, further comprising stopping members protruding at one side or at both sides over or beneath the path of the removing members and allowing passage to the removing members, the distance across which the feed stopping members protrude being adjustable.

* * * * *